United States Patent
Kratzsch et al.

(10) Patent No.: US 9,395,200 B2
(45) Date of Patent: Jul. 19, 2016

(54) METHOD FOR PROVIDING AN OPERATING STRATEGY FOR A MOTOR VEHICLE

(71) Applicant: AUDI AG, Ingolstadt (DE)

(72) Inventors: Claudia Kratzsch, Ingolstadt (DE); Hendrik Roessler, Ingolstadt (DE); Sebastian Engel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/654,041

(22) PCT Filed: Jun. 12, 2013

(86) PCT No.: PCT/EP2013/001727
§ 371 (c)(1),
(2) Date: Jun. 19, 2015

(87) PCT Pub. No.: WO2014/094922
PCT Pub. Date: Jun. 26, 2014

(65) Prior Publication Data
US 2015/0345963 A1      Dec. 3, 2015

(30) Foreign Application Priority Data
Dec. 19, 2012   (DE) .................... 10 2012 024 859

(51) Int. Cl.
*G01C 21/34* (2006.01)
*B60W 50/00* (2006.01)
(Continued)

(52) U.S. Cl.
CPC ......... *G01C 21/343* (2013.01); *B60W 50/0097* (2013.01); *B60W 50/0098* (2013.01);
(Continued)

(58) Field of Classification Search
CPC ... G01C 21/36; B60W 50/0097; G08G 1/167; H04W 84/18
See application file for complete search history.

(56) References Cited

U.S. PATENT DOCUMENTS 8,447,511 B2    5/2013  Frese et al.
8,458,315 B2 *  6/2013  Miche ................. H04L 67/12
                                                           701/1

(Continued)

FOREIGN PATENT DOCUMENTS

| DE | 102005037553 | 2/2007 |
|---|---|---|
| DE | 102005043471 | 3/2007 |

(Continued)

OTHER PUBLICATIONS

German Office Action for German Priority Patent Application No. 10 2012 024 859.8, issued Jan. 23, 2013, 8 pages.

(Continued)

*Primary Examiner* — Thomas Tarcza
*Assistant Examiner* — Alex C Dunn
(74) *Attorney, Agent, or Firm* — Staas & Halsey LLP

(57) ABSTRACT

A method provides an operating strategy for a target vehicle which is located together with other foreign vehicles on a track section of a road track. A communication unit of the target vehicle or of an external data server is connected to a respective communication unit of the foreign vehicles via an ad-hoc network, in particular via a car-to-X communication. A foreign vehicle communicates a position signal and/or an information to an operating parameter. A processing unit determines the positions of the foreign vehicles and can determine a digital model for a current traffic situation in the track section using information related to the operating parameter. The digital model describes the track section and the foreign vehicles located thereon and serves as a basis for an operating strategy for operating the target vehicle. A driving recommendation produces a model output for the driver or triggers automatic driving.

21 Claims, 2 Drawing Sheets

(51) Int. Cl.
*G08G 1/16* (2006.01)
*G08G 1/0967* (2006.01)

(52) U.S. Cl.
CPC ........ *G08G1/163* (2013.01); *B60W 2050/0028* (2013.01); *B60W 2550/40* (2013.01); *B60W 2550/402* (2013.01); *B60W 2550/404* (2013.01); *B60W 2550/408* (2013.01); *G08G 1/096791* (2013.01); *Y02T 10/84* (2013.01)

(56) References Cited

U.S. PATENT DOCUMENTS

| | | | | |
|---|---|---|---|---|
| 8,554,456 | B2* | 10/2013 | Brant | G08G 1/0116 701/117 |
| 8,666,591 | B2* | 3/2014 | Stahlin | G01M 17/00 701/32.4 |
| 2004/0075582 | A1* | 4/2004 | Bergan | G08G 1/01 340/936 |
| 2005/0065711 | A1* | 3/2005 | Dahlgren | G01C 21/26 701/117 |
| 2008/0094250 | A1* | 4/2008 | Myr | G08G 1/04 340/909 |
| 2009/0228172 | A1 | 9/2009 | Markyvech et al. | |
| 2010/0198513 | A1 | 8/2010 | Zeng et al. | |
| 2011/0054716 | A1* | 3/2011 | Stahlin | G01C 21/28 701/1 |
| 2011/0098877 | A1* | 4/2011 | Stahlin | G08G 1/161 701/31.4 |
| 2011/0208399 | A1 | 8/2011 | Fekete et al. | |
| 2012/0143486 | A1* | 6/2012 | Koike | G08G 1/163 701/301 |
| 2012/0277965 | A1* | 11/2012 | Takahashi | B60W 30/143 701/70 |
| 2013/0054106 | A1* | 2/2013 | Schmudderich | B60W 30/0956 701/96 |
| 2013/0116859 | A1* | 5/2013 | Ihlenburg | G06F 17/00 701/2 |
| 2013/0158862 | A1* | 6/2013 | Stahlin | H04W 4/22 701/410 |
| 2013/0191003 | A1* | 7/2013 | Hahne | B60W 50/14 701/99 |
| 2014/0005875 | A1* | 1/2014 | Hartmann | G08G 1/16 701/23 |
| 2014/0074388 | A1* | 3/2014 | Bretzigheimer | B60T 1/10 701/117 |
| 2015/0015421 | A1* | 1/2015 | Krijger | G08G 1/0129 340/932 |

FOREIGN PATENT DOCUMENTS

| | | |
|---|---|---|
| DE | 102008015046 | 9/2008 |
| DE | 102007027297 | 12/2008 |
| DE | 102008019174 | 10/2009 |
| DE | 102010049721 | 4/2012 |
| DE | 102010054077 | 6/2012 |
| DE | 102012009238 | 11/2012 |
| DE | 10 2012 024 859.8 | 12/2012 |
| WO | 2012/009620 | 1/2012 |
| WO | 2012/014041 | 2/2012 |
| WO | 2012/020293 | 2/2012 |
| WO | PCT/EP2013/001727 | 6/2013 |

OTHER PUBLICATIONS

Fernando Terroso-Sáenz et al., "A Cooperative Approach to Traffic Congestion Detection With Complex Event Processing and VANET," IEEE Transactions on Intelligent Transportation Systems, vol. 13, No. 2, Jun. 2012, pp. 914-929.
WIPO English Language Translation of the International Preliminary Report on Patentability for PCT/EP2013/001727, downloaded from WIPO website on Jun. 19, 2015, 9 pages.
The International Search Report for PCT/EP2013/001727, mailed on Aug. 9, 2013, 3 pages.

* cited by examiner

METHOD FOR PROVIDING AN OPERATING STRATEGY FOR A MOTOR VEHICLE

CROSS REFERENCE TO RELATED APPLICATIONS

This application is based on and hereby claims priority to International Application No. PCT/EP2013/001727 filed on Jun. 12, 2013 and German Application No. 10 2012 024 859.8 filed on Dec. 19, 2012, the contents of which are hereby incorporated by reference.

BACKGROUND

The invention relates to a method for providing an operating strategy for at least one motor vehicle on a route section using information about motor vehicles that are present in the surroundings, wherein the information is collected via a vehicle ad hoc network.

Vehicle ad hoc networks are used for communication by motor vehicles in which, inter alia, an information item pertaining to an operating parameter, such as the speed of a motor vehicle, can also be transmitted to a further motor vehicle or a fixed infrastructure component (roadside unit, RSU). This information item can then be used in order to customize the respective operating parameter in the received motor vehicle. A known technology for forming a vehicle ad hoc network is car-to-car communication or more generally, if infrastructure components are also involved, car-to-X communication. These standards are available from the Car-to-Car Communication Consortium, for example.

US 2011/0208399 describes a method for ascertaining a queue risk and a driving strategy, particularly an optimum speed, taking account of operating data (e.g. the speed) of other vehicles by car-to-car communication and queue reports. The motor vehicle driver can have the ascertained result displayed as a driving recommendation.

DE 10 2010 054 077 A1 describes a method for providing a driving recommendation, wherein a probable speed profile for a route section that is ahead of the vehicle is ascertained. To this end, speed profiles recorded from the past are examined for patterns.

A driving recommendation that is based on a probability calculation does not reflect the current situation, however. The disadvantage of the related art is also that the receiving motor vehicle can only react to an existing situation, without the possibility of a predictive mode of driving that avoids the formation of a queue, for example. A typical example is the mode of driving at the end of a queue. When vehicles reach the end of a queue and therefore increase their speed of travel, in many cases this results in fresh, wave-like queue formation behind the actual end of the queue if there are too many vehicles at that location simultaneously.

SUMMARY

One possible object is to provide an operating strategy that predicatively takes account of development of a traffic situation.

The inventors propose a method for providing an operating strategy for at least one motor vehicle, which in this case is referred to as the destination vehicle and which is situated on a route section of a route together with other motor vehicles, in this case called alien vehicles. In this context, an alien vehicle may also simultaneously be a destination vehicle if it both transmits the information required for ascertaining the model to the communication device and receives an operating strategy.

The proposals are based on the concept of taking signals that are produced by the alien vehicles as a basis for producing a digital model of a traffic scenario on the cited route section. The destination vehicle is then that motor vehicle that the method provides with an operating strategy that allows a predictive mode of driving on the route section.

A motor vehicle is preferably a motorcar, particularly an automobile.

A communication device of a destination vehicle or else of a vehicle-external data server uses a data link to a respective communication device of at least one alien vehicle to receive at least one respective position signal from the alien vehicle, which indicates the position of the alien vehicle.

The communication device of the destination vehicle or of the data server is designed to set up a data link to the corresponding devices of the alien vehicles on the route section. In particular, the communication device is realized in an appliance that can preferably set up a connection via an ad hoc network, particularly via car-to-X communication, and use it for communication.

The route section comprises particularly a region in which an ad hoc network can be set up via WLAN (Wireless Local Area Network), for example, that is to say particularly a range of preferably up to 100 m, 300 m, 500 m, in at least one direction from the destination vehicle. In the case of a vehicle-external data server, the range from the destination vehicle preferably likewise has these values or is from 100 m to 300 m, 300 m to 500 m or 100 m to 1000 m. The communication device is part of a processing device that can comprise e.g. a data processing device that is known to a person skilled in the art, e.g. a microcontroller or a computer. In this context, the advantage of a vehicle-integrated processing device is the constant implementability of the method for a user on a journey.

The processing device uses all received position signals to ascertain the positions of the alien vehicles. Using the positions of the alien vehicles, the processing device ascertains a digital model for a current traffic scenario in the route section. In order to ascertain the model, particularly an algorithm for simulating transport systems in large networks, e.g. for ascertaining a Nagel-Schreckenberg model, is used.

The digital model for the current traffic scenario in the route section describes at least the route section and the alien vehicles situated thereon. The at least one destination vehicle, from, can also be included. In a development, the model can also comprise traffic information, e.g. information pertaining to a speed or an average speed e.g. in various subsections of the route section. The digital model may be realized as a pure computation model, but particularly also in the form of a digital representation of the surroundings, e.g. of a map. The digital model can also act as a "micromap" (micro traffic map), that is to say a map of the immediate surroundings. Such a map then shows e.g. an image of the route section on which e.g. individual motor vehicles are shown and/or subsections of the route section are marked, e.g. in accordance with the density of vehicles.

The digital model allows the description of different dynamics for a sum total of motor vehicles in a situation in which a plurality of vehicles are on a route section relatively densely, which vehicles are thus queuing on the route section, for example. In addition, the model allows vehicle-accurate resolution of the traffic situation. In contrast to route sections for which the map material of conventional navigation appliances has very low resolution (e.g. straight route sections), the model allows, in this case too, a high and to-scale resolution for the route section and/or allows the production of a corresponding map.

Using the digital model for the current traffic scenario, the processing device ascertains an operating strategy for operating the at least one destination vehicle on the route section. This benefits a user of a destination vehicle, since an appropriate operating strategy saves fuel, for example. If the user is queuing in his motor vehicle, for example, such an operating strategy avoids the formation or wave-like spread of the queue, which can also prevent the formation of a queue at an early stage. In addition, such an operating strategy promotes the breakup of a queue, for example, as a result of rapid acceleration at the end of the queue.

This also allows control of the sum total of the motor vehicles, which involves the motor vehicles that occupy logistically important positions being provided with an operating strategy.

In a development of the method, the communication device of the destination vehicle or of the data server receives at least one information item, associated with the at least one alien vehicle, pertaining to an operating parameter of the respective alien vehicle. An information item pertaining to an operating parameter may comprise, by way of example, an information item pertaining to a speed, an average speed or a braking process of the vehicle, for example. This information item can likewise be processed advantageously by the processing device.

In this case, the processing device can ascertain the digital model for the current traffic scenario on the basis of the at least one received information item pertaining to the operating parameter of the at least one alien vehicle. The involvement of the operating parameters in the model augments the model and increases the accuracy thereof. Similarly, the ascertainment of an improved operating strategy is made possible that allows the recommendation or implementation of a particular average speed for a destination vehicle, for example.

In a further embodiment of the method, the communication device also receives at least one position signal that indicates the position of a respective destination vehicle. The communication device can likewise receive at least one information item pertaining to an operating parameter of the destination vehicle. Using the at least one position signal, the communication device can ascertain the position of the respective destination vehicle. Using the at least one position and/or the information item pertaining to the operating parameter of the destination vehicle, the processing device can ascertain the digital model for the current traffic scenario in the route section. This results in the immediate advantage for a user of the destination vehicle that he is provided with an operating strategy tailored to his destination vehicle, e.g. in the form of a driving recommendation.

In a preferred embodiment of the method, the processing device can divide the route section into different subsections on the basis of a traffic situation in various instances of its regions, particularly on the basis of the volume of traffic, the average speed or a recommended speed for a destination vehicle. This allows a higher resolution for the model and hence an improved operating strategy.

In a further embodiment of the method, the processing device can additionally receive at least one information item from an infrastructure element, particularly a radio beacon, pertaining to the current traffic situation on the route section or on a subsection of the route section. The at least one additional information item can then be used to compute the model for the current traffic scenario on the route section or on the subsection. It is advantageous in this case for such an infrastructure element to be able to output queue reports and/or to be able to detect a traffic situation in situ. An infrastructure element likewise has the advantage that it can also use a sensor, for example, to detect those motor vehicles on the route section that do not have a communication device and/or a processing device. In both cases, the model is improved.

In one embodiment of the method, the communication device and/or the processing device can comprise an infrastructure element on the route section or can comprise a vehicle-external data server. This allows an operating strategy customized to the situation to be constantly ascertained for a route section on which queues frequently arise, for example.

It has been found to be advantageous for the method if the processing device produces a driving recommendation for executing the operating strategy or a map pertaining to the traffic scenario on the route section and/or on the at least one subsection. This allows the implementation of an operating strategy in a destination vehicle.

According to another development of the method, the operating strategy is transmitted by the processing device to a driver assistance system, particularly to a longitudinal and/or transverse controller, of at least one destination vehicle. A user of a destination vehicle therefore does not need to take action himself.

Alternatively or additionally, the processing device can transmit the driving recommendation and/or the map to a display device for display thereof, e.g. on a headup display or a screen of an infotainment system. In this case, the user of a destination vehicle can either himself decide how to operate his motor vehicle and/or is informed by the operating strategy and understands, by way of example, the reason for which a vehicle assistance system accelerates or does not accelerate, for example. In this case, there is also the option, by way of example, for various driving recommendations to be displayed to the driver and for the driver to select an operating strategy that can be transmitted to the driver assistance system, for example.

In one embodiment of the method, at least one subsection of the route section can be marked in the map on the basis of a particular variable that is relevant to the model of the traffic scenario, particularly the volume of traffic, the average speed or the recommended speed. This allows a higher resolution for the route section and a clear, quickly comprehensible presentation for a displayed map.

The above object is likewise achieved by a processing device that is designed to perform the method relating to a processing device in one of the embodiments of an method that are described above.

The above object is likewise achieved by a motorcar, particularly an automobile, that comprises an processing device and/or is designed to perform an embodiment of an method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
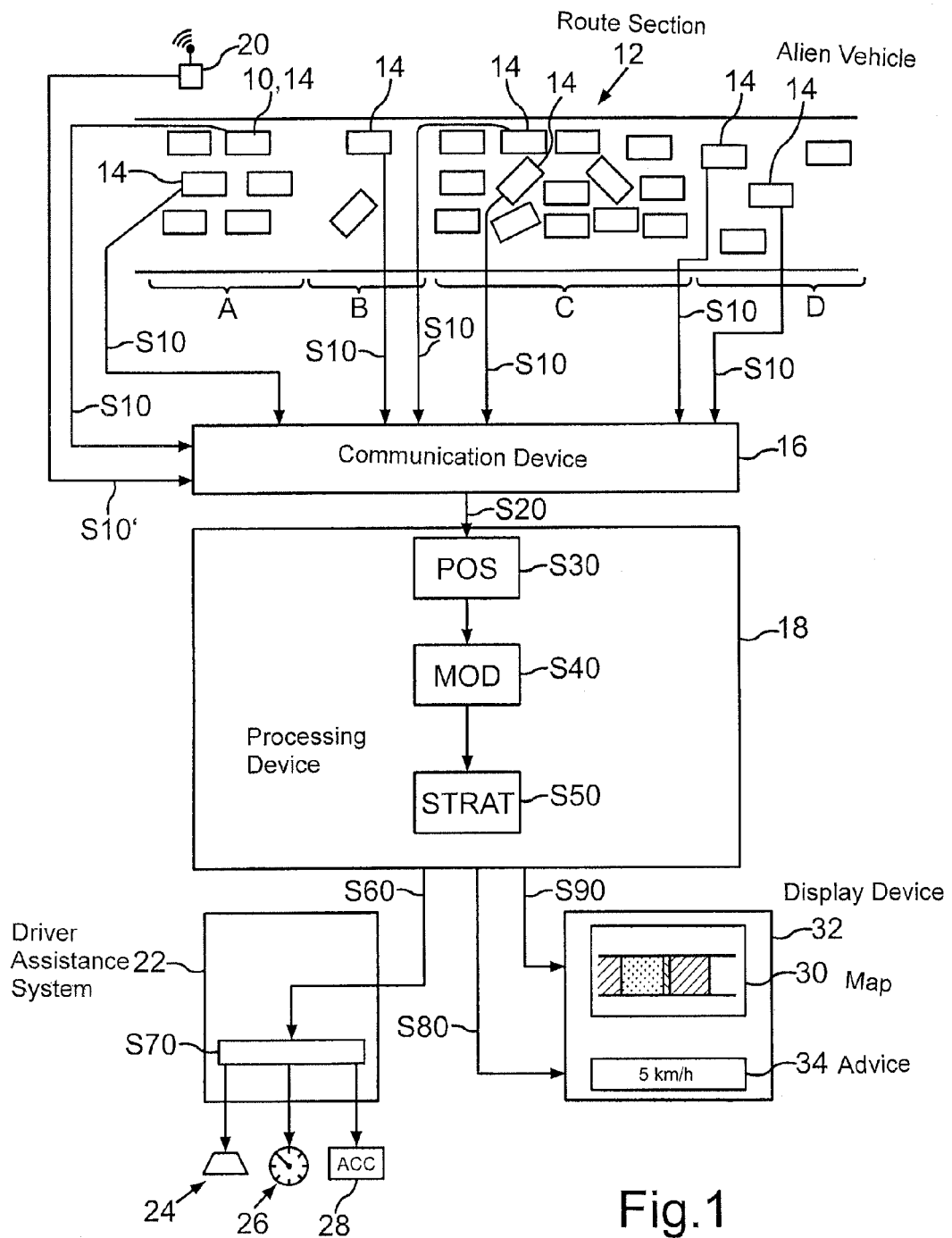
FIG. 1 shows a diagram for an embodiment of the proposed method.

Reference will now be made in detail to the preferred embodiments of the present invention, examples of which are illustrated in the accompanying drawings, wherein like reference numerals refer to like elements throughout.

In one exemplary embodiment, the principle on which the proposed method is based is illustrated with reference to FIG. 1.

On a route section 12 on a route, e.g. on a section of a freeway, there are a plurality of motor vehicles, which may include particularly automobiles. By way of example, the route section 12 can be divided into subsections, wherein, by way of example, two subsections A and C have, by way of example, a high density of vehicles or a low average speed, a subsection B has, by way of example, a low density of vehicles or increased average speed and a subsection D has a very low density of vehicles or high average speed.

In the present example, one of the motor vehicles is a destination vehicle 10 for which the method provides an operating strategy. Some of the motor vehicles 14 are connected to one another via a data link, for example via WLAN in a motor vehicle ad hoc network. The data link is set up by a communication device 16 of the respective alien vehicle.

Status messages, that is to say, by way of example, position signals or information pertaining to, by way of example, the speed of a motor vehicle, can be transmitted cyclically, for example, by the alien vehicles 14 (method S10). In the present example, the destination vehicle 10 likewise transmits said information and a position signal to the communication device 16, that is to say is simultaneously an alien vehicle 14. The position signal can comprise, by way of example, a signal from a global navigation satellite system, such as GPS, Galileo, Compass or Glonass. Additionally or alternatively, the alien vehicles can transmit (S10) information pertaining to an operating parameter, for example a speed or an average speed, to the communication device 16. Additionally or alternatively, an infrastructure element 20, particularly a radio beacon, can transmit (S10') at least one information item pertaining to the current traffic situation on the route section 12 or one of its subsections A, B, C, D to the communication device 16.

Both the communication device 16 and the processing device 18 can comprise an appliance or be implemented in a computer program or a computer program product that is designed to execute an appropriate program code. The communication device 16 and/or the processing device 18 may alternatively or additionally be integrated in a destination vehicle 14 or comprise a vehicle-external data server.

Preferably, the processing device 18 can comprise the communication device 16. Alternatively, as in the example here, the communication device 16 is independent of the processing device 18 and transmits the received signals and information from the alien vehicles 14 to the processing device 18 (S20). The processing device 18, in this case a device of a navigation system, driver assistance system or infotainment system of the motor vehicle 10, for example, uses all position signals to ascertain the positions of the alien vehicles 14 (S30, "POS").

On the basis of the positions of the alien vehicles 14, the processing device 18 ascertains a digital model for a current traffic scenario in the route section (S40, "MOD"). Such a model comprises a micromap, for example, which in the present example comprises the route section 12 and the associated traffic information. In this case, the model can consider the subsections A, B, C and D and the different traffic information therefrom.

On the basis of the digital model, the processing device 18 ascertains an operating strategy for operating the at least one destination vehicle 10 on the route section 12 (S50, "STRAT"). By way of example, there is the option for different operating strategies to be ascertained for the different subsections. If the destination vehicle 10 is in the subsection D, for example, it makes sense, by way of example, for the destination vehicle 10 to accelerate and resume a normal speed of travel, since the subsection D covers the end of the queue, for example, and there are only a few vehicles at that location. In FIG. 1, the destination vehicle 10 is situated shortly before the subsection B. Sharp acceleration would contribute to a wave-like spread of the queue in this case, for example, because the destination vehicle 10 is situated in a queue wave, for example, and would thus come to an abrupt standstill again, for example, in subsection C. An appropriate operating strategy in this case would thus be a low average speed of, by way of example, 5 km/h that is customized to the queue wave, for example in order to avoid or reduce "stop-and-go" for the destination vehicle 10.

The operating strategy can be produced and output by the processing device 18 as a driving recommendation for executing the operating strategy or as a map 30 (S60, S80, S90). The driving recommendation can be transmitted to a driver assistance system 22, particularly to a longitudinal and/or transverse controller, of the destination vehicle 10 (S60). The longitudinal and/or transverse controller can take the driving recommendation, for example, as a basis for initiating automatic motor vehicle control, for example for a brake 24, for a cruise control system 26 or for an adaptive cruise control system (ACC) 28 (S70).

The driving recommendation can also be transmitted as advice 34 in the form of a text message, for example, to a display device 32, for example an infotainment system, for the purpose of display thereof, however (S80). The operating strategy and/or the model can likewise be implemented in a graphical representation 30 of the model, for example a map 30, and transmitted to the display device 32 (S90). By way of example, the map 30 can comprise a view of the route section 12. By way of example, at least one subsection A, B, C, D of the route section 12 may be marked, for example in color, on the map 30 on the basis of a particular variable that is relevant to the model of the traffic scenario, particularly the volume of traffic, the average speed or the recommended speed. This makes the map 30 clearer, and a driver of a destination vehicle 10 marked in the map 30 can see the remaining length of the queue and/or whether he has already reached the end of the queue, for example.

Figure 2:
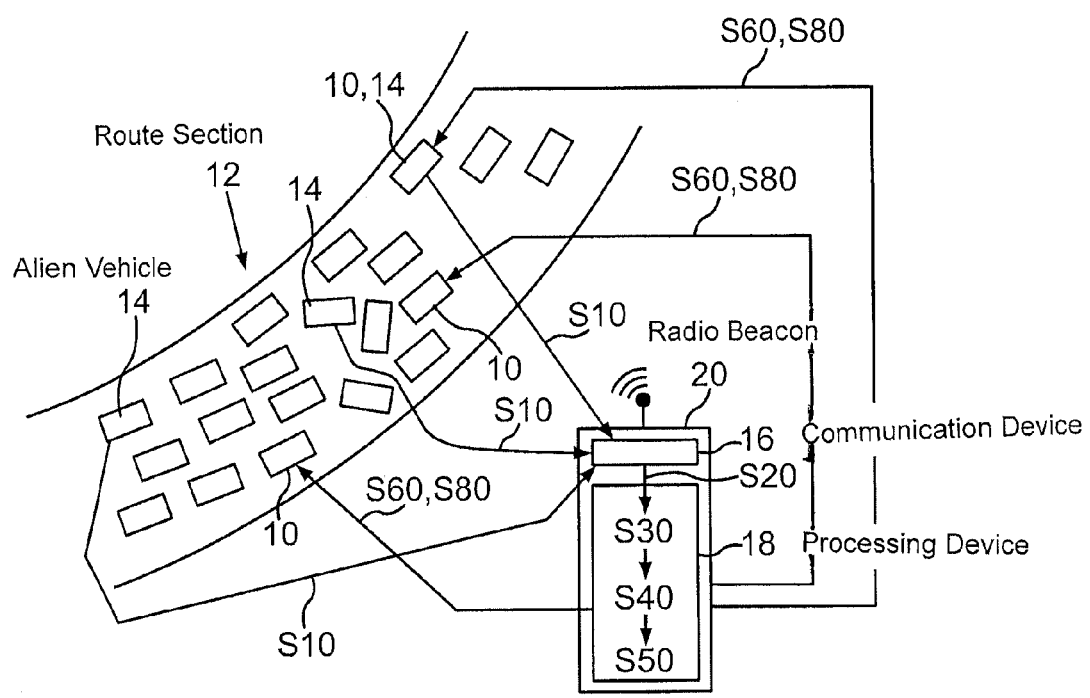
FIG. 2 shows a diagram for a further embodiment of the method.

FIG. 2 shows a further exemplary embodiment of the method.

The method proceeds in this case as already described above for FIG. 1. In this example, however, operating strategies for three destination vehicles 10, for example, are ascertained and transmitted as a driving recommendation (S60, S80). Of these, by way of example, only one of the motor vehicles is also an alien motor vehicle 14 that transmits status messages to a communication device 18. A radio beacon 20 at the edge of the road in the route section 12 can comprise, by way of example, an external data server, for example a back-end server, which in turn comprises the communication device 16 and/or the processing device 18.

The examples illustrate the concept of the proposals that is to use signals produced by the motor vehicles to ascertain a digital model and a digital map of a traffic scenario on a route section on the basis of knowledge of the environment, and to take this as a basis for producing an operating strategy for a destination vehicle.

In this case, vehicles use ad hoc communication (WLAN), for example, to cyclically transmit status messages. These contain information from the vehicle pertaining to the position and speed thereof, for example. If a vehicle is in a queue, for example, it receives the cyclic status messages from the surrounding vehicles by communication. From the sum of the received messages, the vehicle builds up a micromap containing traffic information. By way of example, said micromap contains information pertaining to average speed on road segments that have low resolution. This allows the vehicle to deduce drive strategies in order firstly to avoid the wave-like spread of the queue and in order to help to break up the queue through rapid acceleration at the end (queue breaks up).

The receiving vehicle can customize its drive strategy in the queue by virtue of the surroundings information, for example. This minimizes fuel consumption, for example. The by way of example, wave-like spread of the queue is counteracted. The driver receives detailed information pertaining to the queue, for example, which increases his comfort. Since the vehicle itself receives and evaluates messages from other vehicles, for example, it is possible to build up an exact picture of the surroundings relative to the vehicle.

Vehicles can or need to be equipped with a communication unit (for example WLAN) that cyclically transmits status messages. The receiving vehicle likewise can or needs to be equipped with an appropriate communication unit in order to receive these messages. The receiving vehicle additionally requires a processing unit that combines the information in the received messages to form a micromap containing traffic information and then automatically customizes the drive strategy and/or provides the driver with a recommendation for the drive strategy, for example by an HMI (human/machine interface).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for providing an operating strategy for a destination vehicle situated on a route section of a route together with alien vehicles, comprising:
   receiving position signals respectively from the alien vehicles, each position signal indicating a position of one of the alien vehicles, the position signals being received at a communication device of a processing device, the communication device being connected to respective transmitters of the alien vehicles via a car-to-X ad hoc network;
   dividing, at the processing device, the route section into different subsections based on traffic information from different regions of the route section, the route section being divided based on traffic information selected from the group consisting of volume of traffic, average speed and recommended speed for the destination vehicle;
   using the position signals at the processing device to ascertain the respective positions of the alien vehicles;
   using the positions of the alien vehicles at the processing device to ascertain a digital model for a current traffic scenario in the route section, the digital model for the current traffic scenario being obtained from the traffic information for the subsections, the digital model for the current traffic scenario describing the route section and the alien vehicles situated on the route section; and
   using the digital model for the current traffic scenario at the processing device to ascertain the operating strategy for operating the destination vehicle on the route section.

2. The method as claimed in claim 1, wherein
   the communication device receives an operating parameter information item from at least one of the alien vehicles,
   the communication device transmits the information item to the processing device, and
   the processing device ascertains the digital model for the current traffic scenario based on the information item.

3. The method as claimed in claim 1, wherein
   the communication device receives a position signal from the destination vehicle, the position signal indicating a position of the destination vehicle,
   the position signal is used to ascertain the position of the destination vehicle, and
   both the position of the destination vehicle and the positions of the alien vehicles are used to ascertain the digital model for the current traffic scenario.

4. The method as claimed in claim 1, wherein
   the communication device receives a position signal from the destination vehicle, the position signal indicating a position of the destination vehicle, and
   the position of the destination vehicle is used to tailor the operating strategy to the position of the destination vehicle.

5. The method as claimed in claim 1, wherein
   the communication device receives an information item from an infrastructure element or a radio beacon, the information item pertaining to a current traffic situation on the route section or on one of the subsections, and
   the processing device uses the information item to ascertain the digital model for the current traffic scenario in the route section or in one of the subsections.

6. The method as claimed in claim 5, wherein the infrastructure element or radio beacon has a sensor to detect information regarding motor vehicles on the route section that do not have a transmitter to transmit a respective position signal.

7. The method as claimed in claim 1, wherein the communication device and/or the processing device comprises an infrastructure element on the route section.

8. The method as claimed in claim 1, wherein the communication device and/or the processing device comprises a vehicle-external data server.

9. The method as claimed in claim 1, wherein the processing device is integrated in the destination vehicle.

10. The method as claimed in claim 1, wherein the operating strategy comprises a driving recommendation or a map pertaining to the current traffic scenario on at least one subsection of the route section.

11. The method as claimed in claim 10, wherein
    the operating strategy comprises a driving recommendation, and
    the processing device transmits the driving recommendation to a driver assistance system of the destination vehicle or to a driving controller of the destination vehicle, the driving controller controlling longitudinal and/or transverse driving of the destination vehicle.

12. The method as claimed in claim 10, wherein the processing device transmits the driving recommendation or the map to a display device of the destination vehicle for display on the display device.

13. The method as claimed in claim 1, wherein
operating strategy comprises a map pertaining to the current traffic scenario on at least one subsection of the route section,
the processing device transmits the map to a display device of the destination vehicle for display on the display device, and
the map is displayed with at least one subsection of the route section marked based on the volume of traffic, the average speed or the recommended speed for the destination vehicle, relevant to the at least one subsection.

14. The method as claimed in claim 1, wherein an operating strategy is also ascertained for at least one of the alien vehicles.

15. The method as claimed in claim 1, wherein a different operating strategy is prescribed for each of the different subsections of the route section.

16. The method as claimed in claim 1, wherein
the traffic information for the route section specifies a traffic jam at the route section,
the operating strategy comprises accelerating and resuming a normal speed of travel at an end of the traffic jam, and
the operating strategy further comprises setting a reduced average speed before the traffic jam.

17. The method as claimed in claim 1, wherein the digital model for the current traffic scenario is based on a Nagel-Schreckenberg model.

18. The method as claimed in claim 1, wherein
the operating strategy is to save fuel, and
the operating strategy sets a target speed for the destination vehicle in the subsections of the route section.

19. The method as claimed in claim 1, wherein
the communication device receives an operating parameter from each of the alien vehicles, and
the operating parameter comprises information regarding a current average speed or a current braking situation for each alien vehicle.

20. A processing apparatus for a destination vehicle situated on a route section of a route together with alien vehicles, comprising:
a communication device to receive position signals respectively from the alien vehicles, each position signal indicating a position of one of the alien vehicles, the communication device being connected to respective transmitters of the alien vehicles via a car-to-X ad hoc network; and
a processing device to:
divide the route section into different subsections based on traffic information from different regions of the route section, the route section being divided based on traffic information selected from the group consisting of volume of traffic, average speed and recommended speed for the destination vehicle;
use the position signals to ascertain the respective positions of the alien vehicles;
use the positions of the alien vehicles to ascertain a digital model for a current traffic scenario in the route section, the digital model for the current traffic scenario being obtained from the traffic information for the subsections, the digital model for the current traffic scenario describing the route section and the alien vehicles situated on the route section; and
use the digital model for the current traffic scenario to ascertain the operating strategy for operating the destination vehicle on the route section.

21. A motor car, comprising a processing apparatus as claimed in claim 20.

* * * * *